United States Patent
White et al.

(10) Patent No.: US 9,581,203 B2
(45) Date of Patent: Feb. 28, 2017

(54) SHUNT BEARING WITH INSULATING COATING

(71) Applicant: Schaeffler Technologies AG & Co. KG, Herzogenaurach (DE)

(72) Inventors: Michael White, Lake Wylie, SC (US); Eric Ovendorf, Weddington, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 49 days.

(21) Appl. No.: 14/693,421

(22) Filed: Apr. 22, 2015

(65) Prior Publication Data

US 2016/0312834 A1    Oct. 27, 2016

(51) Int. Cl.
  *F16C 41/00* (2006.01)
  *F16C 19/52* (2006.01)
  *F16C 33/78* (2006.01)
  *F16C 33/62* (2006.01)

(52) U.S. Cl.
  CPC ............ *F16C 41/002* (2013.01); *F16C 19/52* (2013.01); *F16C 33/62* (2013.01); *F16C 33/78* (2013.01)

(58) Field of Classification Search
  CPC .................................................... F16C 41/002
  See application file for complete search history.

(56) References Cited

U.S. PATENT DOCUMENTS

| 3,564,477 | A | * | 2/1971 | Pompei | ............... | F16C 33/7843 |
| | | | | | | 439/17 |
| 3,994,545 | A | | 11/1976 | Van Dorn | | |
| 5,059,041 | A | | 10/1991 | Watanabe et al. | | |
| 5,139,425 | A | | 8/1992 | Daviet et al. | | |
| 6,142,673 | A | | 11/2000 | Kottritsch et al. | | |

(Continued)

FOREIGN PATENT DOCUMENTS

| DE | 102004051186 A1 | 4/2006 |
|---|---|---|
| DE | 102010012664 A1 | 9/2011 |

(Continued)

OTHER PUBLICATIONS

Technical Bulletin. Pro Tech SG Bearing Isolators. Parker Hannifin Corporation, Cleveland, OH. dated 2006.

(Continued)

*Primary Examiner* — Thomas R. Hannon
(74) *Attorney, Agent, or Firm* — Volpe and Koenig, P.C.

(57) ABSTRACT

A rolling bearing including a conductive shield and an insulation coating is provided. The rolling bearing assembly includes a fixable bearing ring including a first raceway and a rotatable bearing ring including a second raceway. A roller assembly includes a cage and a plurality of rolling elements are located in the cage and supported to roll on the first raceway of the fixable bearing ring and the second raceway of the rotatable bearing ring. A shield extends between the fixable bearing ring and the rotatable bearing ring. The shield includes a first end connected to the fixable bearing ring, and at least one electrically conductive element extends from a second end of the shield and contacts the rotatable bearing ring. A conductive extension on the first end of the shield is connectable to ground. The insulation coating covers surfaces of the fixable bearing ring outside of the first raceway.

14 Claims, 2 Drawing Sheets

(56) References Cited

U.S. PATENT DOCUMENTS

| | | | |
|---|---|---|---|
| 6,755,572 B1 * | 6/2004 | Kinbara | F16C 19/52 384/462 |
| 6,976,682 B1 | 12/2005 | Macleod et al. | |
| 7,071,589 B2 | 7/2006 | Bramel et al. | |
| 7,136,271 B2 | 11/2006 | Oh et al. | |
| 7,193,836 B2 | 3/2007 | Oh et al. | |
| 7,498,703 B2 | 3/2009 | Rea, Sr. et al. | |
| 7,878,814 B2 | 2/2011 | Chin et al. | |
| 8,169,766 B2 | 5/2012 | Oh et al. | |
| 8,199,453 B2 | 6/2012 | Oh et al. | |
| 8,248,725 B2 | 8/2012 | Hendriks et al. | |
| 8,432,659 B2 | 4/2013 | Oh et al. | |
| 2006/0007609 A1 | 1/2006 | Oh et al. | |
| 2009/0304318 A1 | 12/2009 | Konno et al. | |
| 2010/0195946 A1 | 8/2010 | Zhou et al. | |
| 2011/0129176 A1 | 6/2011 | Koma et al. | |
| 2011/0317953 A1 | 12/2011 | Moratz | |
| 2012/0119448 A1 | 5/2012 | Stewart et al. | |
| 2013/0301971 A1 | 11/2013 | Cudrnak et al. | |
| 2014/0334758 A1 | 11/2014 | White | |

FOREIGN PATENT DOCUMENTS

| | | |
|---|---|---|
| DE | 102012214623 A1 | 2/2014 |
| JP | 2006226437 A | 8/2006 |
| WO | 2009056098 A1 | 5/2009 |

OTHER PUBLICATIONS

Complete Shaft Grounding Solutions—INPRO/SEAL A Dover Company. Date Unknown (admitted prior art).
SKF Shaft Grounding Ring Kits TKGR series. dated Apr. 2012.
Shaft Grounding. Electro Static Technology-ITW—AEGIS Bearing Protection Ring—Patented Technology. dated 2009.

\* cited by examiner

SHUNT BEARING WITH INSULATING COATING

FIELD OF INVENTION

This application is generally related to a rolling bearing and more particularly related to electrical discharge damage protection for a rolling bearing.

BACKGROUND

Rolling bearings are widely used in various mechanical applications, including automotive and industrial applications. Grounding devices are used in a variety of bearing applications, including AC or DC electrical motors, generators, and other applications having rotating shafts. Grounding devices are used to prevent shaft induced currents from causing electrical discharge machining (EDM) due to electrical currents passing through a rolling bearing component. EDM causes pitting, fluting, and fusion craters on the rolling bearing components resulting in premature rolling bearing failure. Known EDM prevention methods include di-electric ceramic bearing coatings, Faraday shields, electrically conductive bearing grease, and shaft-contacting ground brushes.

Di-electric ceramic bearing coatings include a hard brittle coating that can fracture during installation or during running. Cracks in the coating can allow current to pass through the bearing which results in EDM. Di-electric ceramic bearing coatings also have limited di-electric strength and at high voltage potential, current can pass through the coating structure compromising the EDM protection of the coating. Known Faraday shields are disclosed in U.S. Pat. No. 7,878,814. Faraday shields are expensive to implement in most rolling bearing applications. Electrically conductive grease or liquid metal, such as disclosed in U.S. Pat. No. 8,248,725, are used to allow current to continuously pass through bearing surfaces but may contain elements such as copper, carbon, or phosphorous which can cause excessive wear on the bearing surfaces and lead to premature failure of the rolling bearing.

Spring loaded shaft grounding brushes allow a continuous flow of current to ground. Known grounding brushes are prone to excessive wear, material transfer, and oxide formation on the mating surface. These oxides may become a di-electric and may prevent effective current transfer from the shaft to the ground. This can cause electrical arcing and lead to damage of the shaft. Once the impedance of the shaft grounding brush exceeds the impedance of the bearings, the current can seek ground through the bearings which can potentially cause EDM damage to the bearings. Shaft grounding brushes may also vibrate due to imperfections in the shaft surface, i.e. an out of round condition. When the grounding brush momentarily loses contact with the shaft during vibration, the current can arc from the grounding brush to the shaft causing EDM damage. Alternatively, the current can flow through the bearings if the voltage potential is sufficiently high while the brush loses contact with the shaft during vibration. Traditional spring loaded shaft grounding brushes are prone to rapid and excessive wear and can ultimately lose contact with the shaft causing the current to seek ground through the bearing and causing EDM damage in the bearing. Known shaft grounding brushes are typically not installed too close to the bearing; however, providing a grounding surface near the bearing is essential to protecting the bearing surfaces against EDM.

As shown above, known EDM protection for bearings are either too expensive, unreliable, or can cause damage to the bearing components. One improvement for preventing EDM is disclosed in U.S. Pub. No. 2014/0334758, which is commonly owned by Schaeffler Technologies and incorporated by reference herein as if fully set forth. U.S. Pub. No. 2014/0334758 discloses a shield for a bearing assembly including a first end connected to a fixed bearing ring and an electrically conductive element contacting a rotating bearing ring. It would be desirable to provide an improvement to this known rolling bearing assembly that increases the resistance for current to flow through the bearing ring-rolling element-bearing ring pathway and encourages current to flow through the shield arranged between the bearing rings to prevent EDM to the rolling element and races.

SUMMARY

It would be desirable to provide a cost effective and reliable EDM protection for rolling bearing components. By arranging an insulation coating outside of a raceway of a fixable ring of the rolling bearing assembly, damage to the insulation coating is prevented to the insulation coating during installation or running, and the insulation coating encourages a conductive pathway away from the rolling elements of the rolling bearing assembly.

A rolling bearing including a conductive shield and an insulation coating is provided. The rolling bearing assembly includes a fixable bearing ring including a first raceway and a rotatable bearing ring including a second raceway. A roller assembly includes a cage and a plurality of rolling elements located in the cage supported to roll on the first raceway of the fixable bearing ring and the second raceway of the rotatable bearing ring. A shield extends between the fixable bearing ring and the rotatable bearing ring. The shield includes a first end connected to the fixable bearing ring, and at least one electrically conductive element extends from a second end of the shield and contacts the rotatable bearing ring. A conductive extension on the first end of the shield from the at least one electrically conductive element is connectable to ground. An insulation coating covers surfaces of the fixable bearing ring outside of the first raceway, at least in ground contact areas.

In another embodiment, a rolling bearing assembly including two shields is provided. The rolling bearing assembly includes a fixable bearing ring having a first raceway that is fixed on a housing, and a rotatable bearing ring including a second raceway. A roller assembly includes a cage and a plurality of rolling elements located in the cage supported to roll on the first raceway of the fixable bearing ring and the second raceway of the rotatable bearing ring. The two shields each extend between the fixable bearing ring and the rotatable bearing ring. The shields each include a first end connected to the fixable bearing ring, and at least one electrically conductive element that extends from a second end of the respective shield and contacts the rotatable bearing ring. At least one of the shields includes a conductive extension from the at least one electrically conductive element on the first end of the shield that contacts the housing for grounding. An insulation coating covers surfaces of the fixable bearing ring outside the first raceway, at least in ground contact areas.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
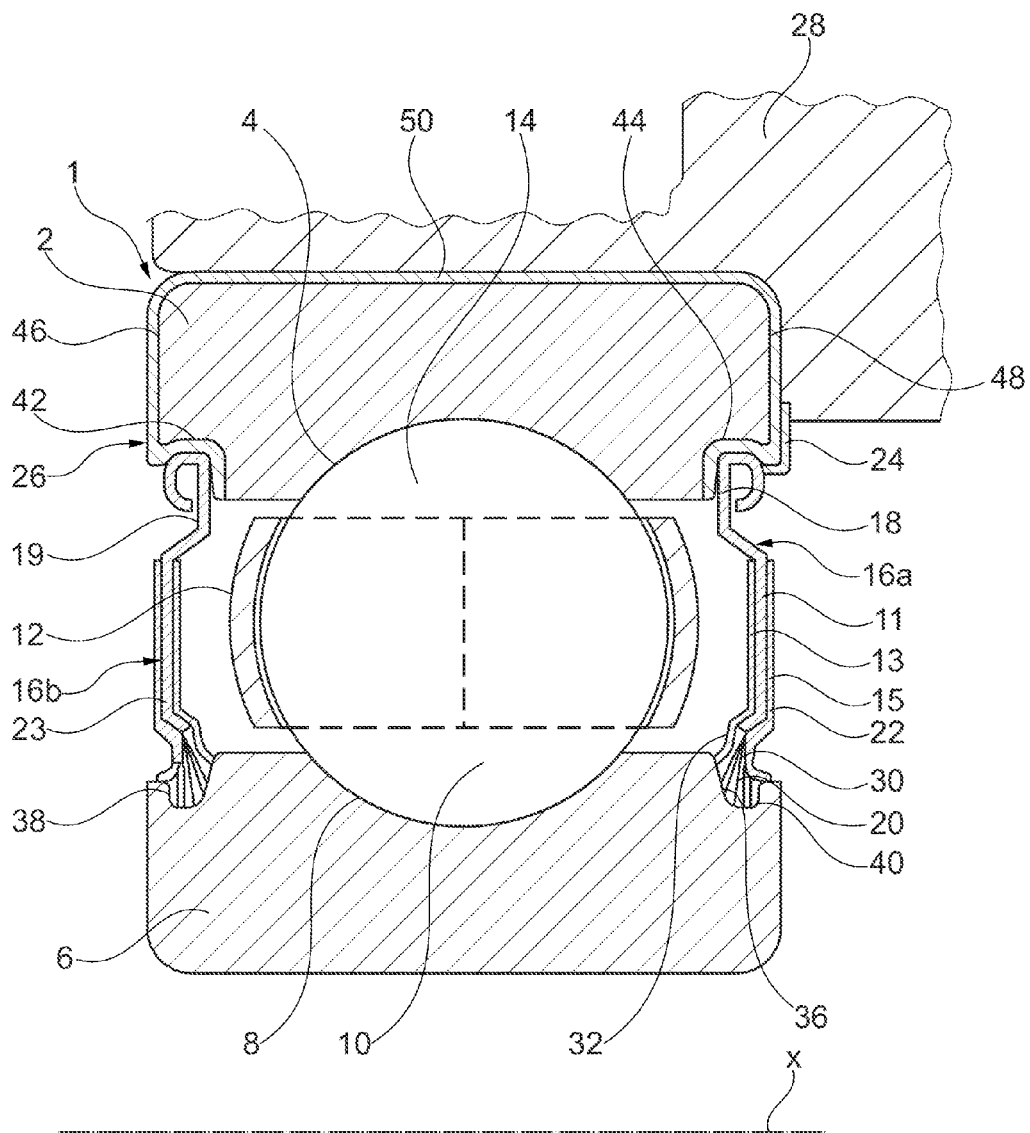
FIG. 1 is cross-sectional view of a rolling bearing assembly according to a first preferred embodiment.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

As shown in FIG. 1, a rolling bearing assembly 1 for preventing electrical discharge damage is provided in cross-section. The rolling bearing assembly 1 includes a fixable bearing ring 2 including a first raceway 4 and a rotatable bearing ring 6 including a second raceway 8. In one embodiment, the fixable bearing ring 2 is a radially inner ring and the rotatable bearing ring 6 is a radially outer ring. In another embodiment, the fixable bearing ring 2 is a radially outer ring and the rotatable bearing ring 6 is a radially inner ring, with the bearing 1 having a centerline X as shown in FIG. 1. One of ordinary skill in the art would recognize that the rolling bearing assembly 1 could be a radial or axial bearing. A shaft (not shown) can be supported on either bearing ring 2, 6.

A roller assembly 10 includes a cage 12 and a plurality of rolling elements 14 located in the cage 12. In one embodiment, the plurality of rolling elements 14 include spherical rolling elements. In another embodiment, the plurality of rolling elements 14 include cylindrical rollers. The plurality of rolling elements 14 are supported to roll on the first raceway 4 of the fixable bearing ring 2 and the second raceway 8 of the rotatable bearing ring 6.

A shield 16a, 16b is offset from the roller assembly 10 and extends between the fixable bearing ring 2 and the rotatable bearing ring 6. In one embodiment, two shields 16a, 16b are provided on either side of the roller assembly 10. However, a single shield 16a could be used. The shield 16a includes a first end 18 connected to the fixable bearing ring 2. At least one electrically conductive element 20 extends from a second end 22 of the shield 16a and contacts the rotatable bearing ring 6. In one embodiment, the shield 16a comprises a rubber or polymeric material that includes conductive nanofibers. A conductive extension 24 on the first end 18 of the shield 16a is connectable to ground.

An insulation coating 26 covers surfaces of the fixable bearing ring 2 outside of the first raceway 4, at least in ground contact areas, for example contacts areas with a grounded housing 28. Damage to the insulation coating 26 is reduced during installation and running since the insulation coating 26 is located outside of the raceway 4. In one embodiment, the insulation coating 26 comprises a ceramic material. The insulation coating 26 preferably covers (1) the first and second grooves 42, 44 of the fixable bearing ring 2 arranged adjacent to the first raceway 4, (2) axial end faces 46, 48 of the fixable bearing ring 2, and (3) an end face 50 of the fixable bearing ring 2 on an opposite side from the first raceway 4. One of ordinary skill in the art would recognize that the insulation coating 26 can be applied to other combinations of the surfaces of the fixable bearing ring 2.

The insulation coating 26 increases the resistance between the potential grounding path from the rotatable bearing ring 6 to the roller assembly 10 to the fixable bearing ring 2. The insulation coating 26 is a di-electric and the increased resistance to current flow through the rotatable bearing ring 6 to rolling element 14 to fixable bearing ring 2 pathway encourages the current to flow through the shield 16a which is the path of least resistance for grounding through the rolling bearing assembly 1. The impedance of the pathway through the shield 16a and between rings 2, 6 is much less than the impedance between the rings 2, 6 and the rolling elements 14 based on the insulation coating 26 blocking current flow to ground through the housing 28. In one embodiment, the fixable bearing ring 2 is fixed to a housing 28, and the conductive extension 24 contacts the housing 28. Other arrangements of the conductive extension 24 can be used as long as the conductive extension 24 is grounded. In one embodiment, the conductive extension 24 is made integral with the first end 18. In another embodiment, the conductive extension 24 is separately formed from the first end 18 and in direct contact with the first end 18. The conductive extension 24 can contact any surface of a surrounding housing 28, including a radial or axial surface.

In one embodiment, the at least one electrically conductive element 20 includes a conductive rubber/polymer inner seal 32. In another embodiment, the at least one electrically conductive element 20 includes a conductive rubber/polymer outer seal. In one embodiment, a plurality of filaments 30 extend from the at least one electrically conductive element 20 and contact the rotatable bearing ring 6. In one embodiment, the at least one electrically conductive element 20 includes carbon fiber filaments 36. One of ordinary skill in the art would recognize that alternative arrangements and materials can be used for the at least one electrically conductive element 20 as long as the at least one electrically conductive element 20 contacts the rotatable bearing ring 6 and provides a low resistance pathway for current from the rotatable bearing ring 6.

In one embodiment, the fixable bearing ring 2 and the rotatable bearing ring 6 each include at least one groove 38, 40, 42, 44. The first and second ends 18, 22 of the shield 16a engage respective ones of the grooves 40, 44 of the fixable bearing ring 2 and the rotatable bearing ring 6. As shown in FIG. 1, the shield 16a preferably includes a body portion 11 and conductive seals 13, 15 on either side of the body portion 11. In one embodiment, the plurality of filaments 30 extend from the electrically conductive element 20 and the plurality of filaments 30 contact the groove 40 of the rotatable bearing ring 6.

The at least one groove preferably comprises first and second ones of the grooves 38, 40, 42, 44 on each of the fixable bearing ring 2 and the rotatable bearing ring 6 with pairs of the grooves 38, 40, 42, 44 being located on each side of the roller assembly 10. As shown in FIG. 1, two shields 16a, 16b are provided, with the ends 18, 19, 22, 23 of the shields 16a, 16b engaging respective ones of the grooves 44, 42, 40, 38 of the bearing rings 2, 6 on each of the sides of the roller assembly 10.

Figure 2:
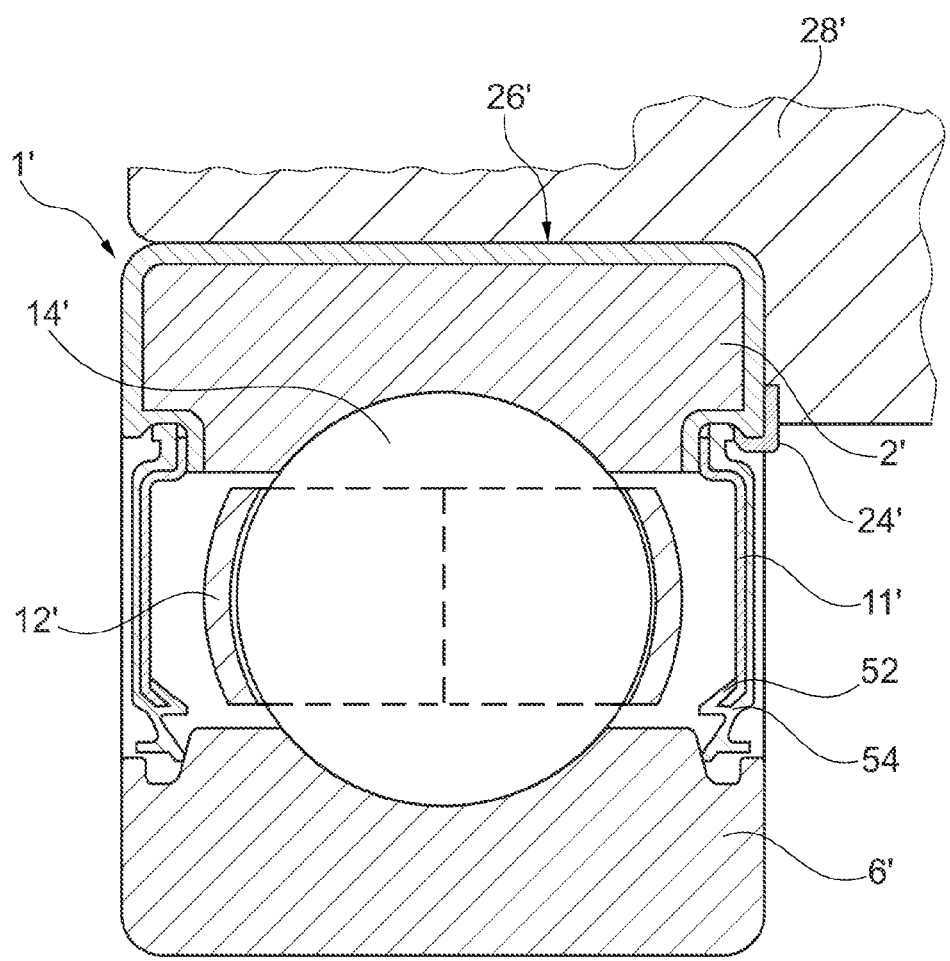
FIG. 2 is cross-sectional view of a rolling bearing assembly according to a second preferred embodiment.

As shown in FIG. 2, in another embodiment of the bearing assembly 1', conductive seals 52, 54 extend between the rings 2', 6'. The bearing assembly 1' includes rolling elements 14' located in a cage 12', and an insulation coating 26' arranged on a grounded housing 28'. In both FIGS. 1 and 2, a conductive path for the bearing assembly 1, 1' is provided away from the rolling elements and the conductive path through the rolling elements is insulated from ground in order to prevent EDM damage. In the embodiment of FIG.

2, the conductive seals 52, 54 preferably comprise a rubber or polymeric material that includes conductive nanofibers, such as copper, silver, or gold nanofibers. The conductive seals 52, 54 are arranged on either side of a body portion 11' of the shield, formed, for example, of aluminum or another suitable material. In one embodiment, the conductive extension 24' is integral with the conductive seal 54. In another embodiment, the conductive extension 24' is separately formed but in direct contact with the conductive seal 54.

Having thus described various embodiments of the present rolling bearing assembly in detail, it will be appreciated and apparent to those skilled in the art that many changes, only a few of which are exemplified in the detailed description above, could be made in the bearing assembly according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A rolling bearing assembly with electrical discharge damage protection, comprising:
   a fixable bearing ring including a first raceway;
   a rotatable bearing ring including a second raceway;
   a roller assembly including a cage and a plurality of rolling elements located in the cage supported to roll on the first raceway of the fixable bearing ring and the second raceway of the rotatable bearing ring;
   a shield assembly extending between the fixable bearing ring and the rotatable bearing ring, the shield assembly including
      a shield with a first end connected to the fixable bearing ring;
      at least one electrically conductive element that extends from a second end of the shield and contacts the rotatable bearing ring; and
      a conductive extension conductively connected to the at least one electrically conductive element on the first end of the shield that is connectable to ground; and
   an insulation coating that covers surfaces of the fixable bearing ring outside of the first raceway, at least in ground contact areas.

2. The rolling bearing assembly of claim 1, wherein the fixable bearing ring is fixable to a housing, and the conductive extension is connectable to the housing.

3. The rolling bearing assembly of claim 1, wherein the fixable bearing ring is a radially outer ring and the rotatable bearing ring is a radially inner ring.

4. The rolling bearing assembly of claim 1, wherein a plurality of filaments extend from the at least one electrically conductive element and contact the rotatable bearing ring.

5. The rolling bearing assembly of claim 1, wherein the at least one electrically conductive element includes at least one of:
   (1) a conductive rubber/polymer inner seal;
   (2) a conductive rubber/polymer outer seal; or
   (3) carbon fiber filaments.

6. The rolling bearing assembly of claim 1, wherein the fixable bearing ring and the rotatable bearing ring each include at least one groove.

7. The rolling bearing assembly of claim 6, wherein the first and second ends of the shield assembly engage respective ones of the grooves of the fixable bearing ring and the rotatable bearing ring.

8. The rolling bearing assembly of claim 7, wherein a plurality of filaments extend from the electrically conductive element and the plurality of filaments contact the groove of the rotatable bearing ring.

9. The rolling bearing assembly of claim 6, wherein the at least one groove comprises first and second ones of the grooves on each of the fixable bearing ring and the rotatable bearing ring, with pairs of the grooves being located on each side of the roller assembly, and two of the shield assemblies are provided, with the ends of the shield assemblies engaging respective ones of the grooves on each of the sides of the roller assembly.

10. The rolling bearing assembly of claim 9, wherein the insulation coating covers (1) the first and second grooves of the fixable bearing ring arranged adjacent to the first raceway, (2) axial end faces of the fixable bearing ring, and (3) an end face of the fixable bearing ring on an opposite side from the first raceway.

11. A rolling bearing assembly with electrical discharge damage protection, comprising:
    a housing;
    a fixable bearing ring including a first raceway that is fixed on the housing;
    a rotatable bearing ring including a second raceway;
    a roller assembly including a cage and a plurality of rolling elements located in the cage and supported to roll on the first raceway of the fixable bearing ring and the second raceway of the rotatable bearing ring;
    two shield assemblies each extending between the fixable bearing ring and the rotatable bearing ring, the shield assemblies each including a shield having a first end connected to the fixable bearing ring, and the shield assemblies including at least one electrically conductive element that extends from a second end of the shield and contacts the rotatable bearing ring;
    at least one of the shield assemblies includes a conductive extension conductively connected to the at least one electrically conductive element on the first end of the shield that contacts the housing for grounding; and
    an insulation coating that covers surfaces of the fixable bearing ring outside the first raceway, at least in ground contact areas.

12. The rolling bearing assembly of claim 11, wherein the plurality of rolling elements include spherical rolling elements.

13. The rolling bearing assembly of claim 11, wherein the shield assemblies comprise a rubber or polymeric material that includes conductive nanofibers.

14. The rolling bearing assembly of claim 11, wherein the insulation coating comprises a ceramic material.

* * * * *